United States Patent [19]

Baker et al.

[11] 3,940,514
[45] Feb. 24, 1976

[54] METHOD OF COATING ELECTROSTATOGRAPHIC CARRIER PARTICLES

[75] Inventors: Donald Arthur Baker, Luton; Peter Robert Billings, Ruislip Manor, both of England

[73] Assignee: Rank Xerox Ltd., London, England

[22] Filed: Dec. 17, 1973

[21] Appl. No.: 425,388

Related U.S. Application Data

[63] Continuation of Ser. No. 35,801, May 8, 1970, abandoned.

[30] Foreign Application Priority Data

May 9, 1969  United Kingdom............... 23804/69

[52] U.S. Cl. ................. 427/213; 118/62; 118/303; 427/216; 427/221
[51] Int. Cl.² ......................................... B05D 7/00
[58] Field of Search ....... 117/100, DIG. 6; 118/303, 118/62; 423/74; 427/213, 216, 221

[56] References Cited
UNITED STATES PATENTS

| | | |
|---|---|---|
| 2,618,551 | 10/1948 | Walkup............................... 117/100 |
| 3,112,220 | 11/1963 | Heiser, Jr. et al. ................. 117/100 |
| 3,196,827 | 7/1965 | Wurster et al...................... 117/100 |
| 3,293,330 | 12/1966 | White ............................ 117/DIG. 6 |
| 3,526,533 | 9/1970 | Jacknow et al..................... 117/100 |

Primary Examiner—William D. Martin
Assistant Examiner—Dennis C. Konopacki

[57] ABSTRACT

A method of coating electrostatographic carrier particles comprising introducing an upwardly flowing low pressure gas and a centrally located upwardly flowing high pressure gas at about one-third their full flow rate into a combined fluidized bed and spouted bed coating apparatus, loading carrier particles into the coating apparatus, increasing the flow rate of the low pressure gas to its full flow rate of about 305 cubic feet per minute with heating to heat the carrier particles, increasing the flow rate of the high pressure gas to its full flow rate of about 16 cubic feet per minute at about 1.5 atmospheres to form a fluidized bed of the carrier particles, introducing a solution or dispersion of coating material in a carrier liquid into the fluidized bed whereby the carrier particles are contacted with a cloud of atomized liquid droplets of the coating material in a disperse state resulting in a homogenous distribution of the liquid droplets among the carrier particles, and maintaining the fluidized bed of carrier particles at a temperature and for a time sufficient to volatilize and evaporate the carrier liquid.

8 Claims, 1 Drawing Figure

U.S. Patent Feb. 24, 1976 3,940,514
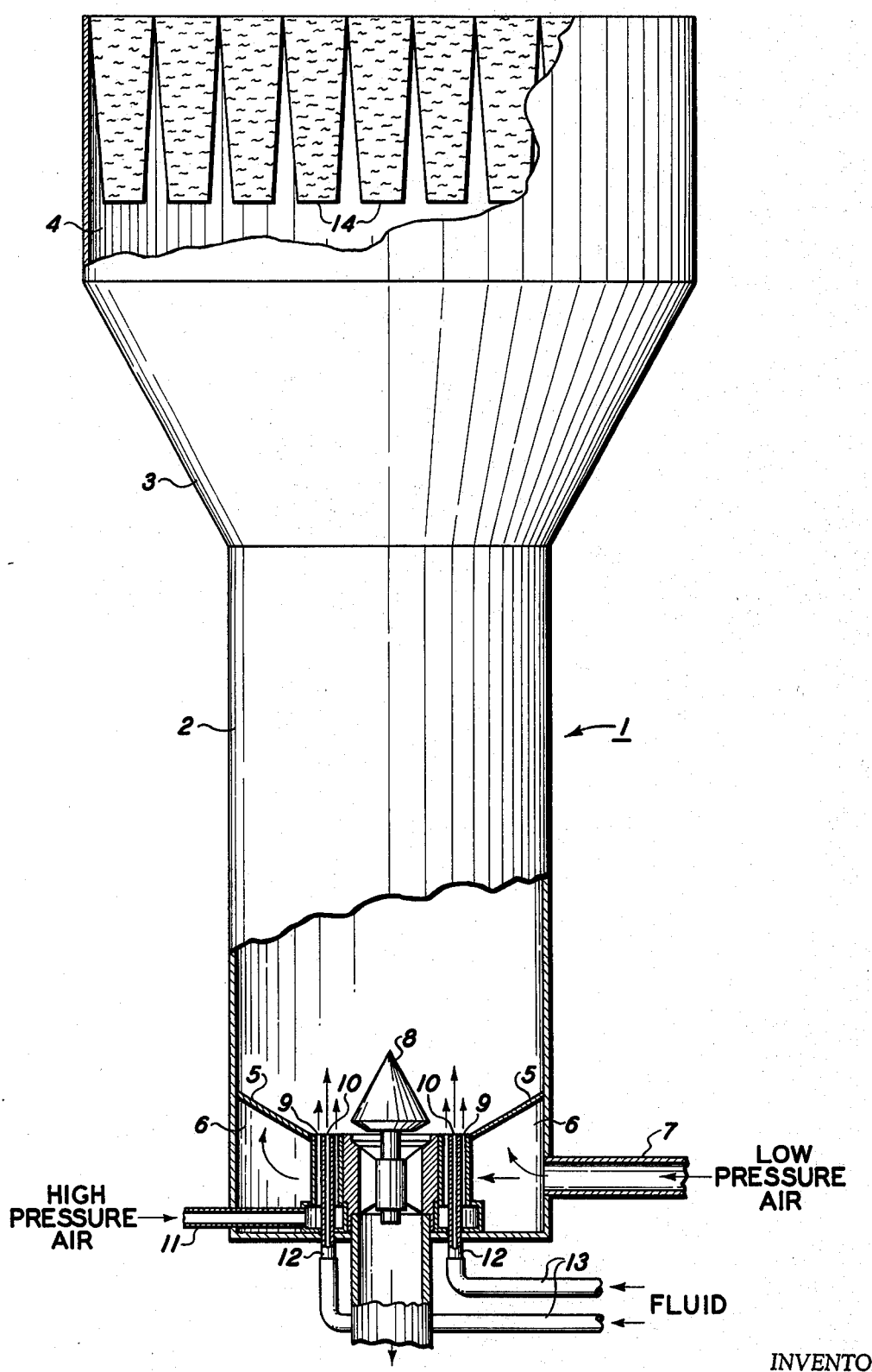
INVENTORS
DONALD A. BAKER
PETER R. BILLINGS
BY
*Peter H. Kondo*
ATTORNEY

METHOD OF COATING ELECTROSTATOGRAPHIC CARRIER PARTICLES

This application is a continuation application of parent application Ser. No. 35,801, filed on May 8, 1970, now abandoned.

BACKGROUND OF THE INVENTION

This invention relates to the production of coated carrier particles for use in xerographic developers.

Several systems for development of xerographic images are known. One system which has been found to be very satisfactory is that of cascade development. In cascade development, a mixture of finely divided marking particles, referred to as toner particles, and of larger sized carrier particles is caused to flow over the surface of a xerographic member bearing an electrostatic latent image. The triboelectric relationship between the toner particles and carrier particles is such that the toner particles bear an electrostatic charge opposite in sign to that of the electrostatic latent image. The forces of attraction between the electrostatic latent image and the toner particles are sufficient to overcome the forces of attraction between the toner particles and the carrier particles. Thus, the electrostatic latent image is developed into a visible image.

It is possible to modify the triboelectric characteristics of the carrier particles by applying a coating material to the surface of the particles. It is then the coating on the particles rather than the particles themselves which determines the triboelectric characteristics. In the past, it has been possible to achieve the application to carrier particles of such coatings by tumbling the particles with the coating material or with a solution of the coating material and evaporation of the solvent from this solution.

Consideration has recently been given to the use of xerographic developers containing carrier particles of much smaller size than has until now been common. It has been found that the use of developers of this type can be particularly advantageous in high speed automatic xerographic machines. However, attempts to apply coatings to carrier particles of such small size, for example of the order of 250 microns, by conventional tumbling techniques have not been very successful because of the tendency of the particles to stick together during the tumbling operation. Since most carrier coating techniques are deficient in one or more of the above areas, there is a continuing need for an improved carrier coating process.

SUMMARY OF THE INVENTION

It is therefore, an object of this invention to provide a carrier coating technique overcoming the above noted deficiencies.

It is another object of this invention to provide a carrier coating technique which reduces carrier particle agglomeration during coating.

It is a further object of this invention to provide a carrier coating technique capable of coating relatively small carrier particles.

It is a still further object of this invention to provide a carrier coating technique superior to those of known techniques.

The above objects and others are accomplished by fluidizing a bed of carrier particles, introducing a solution or dispersion of coating material in a carrier liquid into the fluidized bed and maintaining the bed at a temperature sufficient to evaporate the carrier liquid.

The advantages of the improved carrier coating system will become further apparent upon consideration of the following disclosure of the invention, particularly when taken in conjunction with the accompanying drawing wherein a schematic sectional view of a fluidized bed coating apparatus is illustrated.

DESCRIPTION OF THE PREFERRED EMBODIMENTS

In general, any of the materials known in the art to be suitable for carrier particles or coating materials can be used. Typical materials for coating carrier particles are disclosed in U.S. Pat. No. 2,618,551. However, the method of the invention is not restricted to the treatment of any particular type of carrier particle or the use of any particular coating material.

Where the coating material is soluble in readily available solvents it is usually preferable to employ a solution of the coating material rather than a dispersion but if the coating material is not sufficiently soluble in common solvents then a dispersion, including emulsions and suspensions, of the material in a suitable liquid can be used provided that any dispersing agent employed, if any, in formulating the dispersion does not adversely affect the triboelectric characteristics of the product.

The method of the invention can be carried out with the aid of equipment such as that commercially available from the firm of Vometec N.V. of Holland. A schematic drawing of this type of mixing equipment is shown in the accompanying drawing.

The Vometec mixing equipment comprises a vessel 1 having a cylindrical portion 2 above which is a frusto-conical section 3 surmounted by an expension chamber 4.

Near the base of the cylindrical section 2 is a conical ring 5. This is finely perforated with holes, now shown, of about 1,000 microns. Low pressure air is passed through the perforations in the conical ring 5 from a chamber 6, this air being introduced through an inlet 7.

In the center of the conical ring 5 there is provided a conical plug 8 which serves to block a discharge opening in the center of conical ring 5. The vessel 1 can be discharged by raising the plug 8.

The plug 8 seats on an annular member 9 which contains a ring of nozzles 10 to which high pressure air is supplied from an inlet 11. Within each of the nozzles 10 there is located a supply pipe 12 to which liquid is passed from supply lines 13.

The liquid, comprising a solution or dispersion of a coating material, which is supplied through the lines 13, is atomised and conveyed into a fluid bed of carrier particles maintained within the cylindrical section 2 of the vessel 1. In the fluid bed, dry carrier particles are entrained by the high pressure air emerging from the nozzles 10 and are intensively mixed with the atomised liquid emerging from the pipes 12. The temperature of the vessel 1 is maintained by heating the low pressure air introduced through inlet 7, at a temperature sufficient that the carrier liquid in the liquid supplied through the pipes 12 is volatilized and is removed from the vessel 1 by way of the expansion chamber 4. Any solid material is removed from the outlet gas by filter members 14.

It will be appreciated that the Vometec mixing equipment described with respect to the accompanying drawing uses a combination of "fluidized bed" and "spouted bed" principles. It is characteristic of such equipment that a cloud of liquid droplets are brought into a fluidized dry material in a disperse phase; this results in a homogeneous distribution of the liquid droplets among the solid particles. In general, any system may be used wherein the carrier particles are in the form of a fluidized bed, i.e. wherein the carrier particles are supported by a fluid so that there is a low mutual friction between the carrier particles.

By way of example, equipment of the type shown in the accompanying drawing is used for the production of carrier particles comprising particles of steel shot bearing a coating of a synthetic organic resin. The materials and operating procedures are as follows:

| | |
|---|---|
| Shot charge | 200 lbs. |
| Bed temperature | 40°C. approximately. |
| Shot density | 7.4 gms/c.c. |
| Shot particle size analysis | through 600 microns sieve 100 percent W/W. |
| | through 500 microns sieve 95–100 percent W/W. |
| | through 355 microns sieve 0–5 percent W/W. |
| Low Pressure air rate | 305 c.f.m. at S.T.P. (used at 40°C. 72" W.) |
| High pressure air rate | 16 c.f.m. at S.T.P. (used at 1.5 atmosphere) |
| Weight of lacquer | 7.9 lbs. |
| Lacquer composition (percent by weight) | Carbon black 0.95, Terpolymer of methyl methacrylate, Styrene and Vinyl triethoxysilane 9.55, and Toluene (solvent for terpolymer) 20.70 Xylene 68.80 |

In operation the low and high pressure air are first turned on at one-third the normal flow rate, the steel shot is loaded into the cylindrical section 2 and the low pressure air is increased to the normal rate with heating. When the steel shot charge is at the desired temperature the high pressure air is increased to the normal flow rate and the lacquer is pumped in through jets 13 through a metering pump. The lacquer injection time is about twenty minutes. The high pressure air is not heated. Fluidizing is continued for about five minutes after the lacquer injection has been completed.

The initial step of supplying air at one-third the normal rate is to prevent blinding of the holes in the perforated conical ring 5 and the ring of nozzles 10.

In practice, the lacquer injection rate has not been found a major process control variable, but the lacquer dilution is important to obtain uniformity of coating between particles. The balance is struck between solvent vapor concentration, lacquer dilution and lacquer injection rate. A highly volatile solvent, e.g. toluene, would evaporate too rapidly, so to avoid the need for cooling the fluidizing air, a less volatile solvent, e.g., xylene, is used with moderate heating of the fluidizing air to give the necessary process control.

Although specific materials and conditions are set forth in the foregoing examples, these are merely intended as illustrations of the present invention. Various other suitable carrier particles, carrier coating materials, solvents, air pressures and apparatus including those listed above may be substituted in the specific examples with similar results. Other materials may also be added to the carrier particles or coating material to sensitize, synergize or otherwise improve the coating properties or other desirable properties of the system.

Other modifications of the present invention will occur to those skilled in the art upon a reading of the present disclosure. These are intended to be included within the scope of this invention.

What is claimed is:

1. A method of coating electrostatographic carrier particles comprising introducing an upwardly flowing low pressure gas and a centrally located upwardly flowing high pressure gas at about one-third their full flow rate into a combined fluidized bed and spouted bed coating apparatus, loading said carrier particles into said coating apparatus, increasing the flow rate of said low pressure gas to its full flow rate of about 305 cubic feet per minute at S.T.P. with heating to about 40°C to bring said carrier particles to said temperature, increasing the flow rate of said high pressure gas to its full flow rate of about 16 cubic feet per minute at S.T.P. at about 1.5 atmospheres to form a fluidized bed of said carrier particles, introducing a solution or dispersion of coating material in a carrier liquid into said fluidized bed whereby said carrier particles are contacted with a cloud of atomized liquid droplets of said coating material in a disperse state resulting in a homogeneous distribution of said liquid droplets among said carrier particles, and maintaining said fluidized bed of carrier particles at a temperature and for a time sufficient to volatilize and evaporate said carrier liquid.

2. A method of coating electrostatographic carrier particles according to claim 1 including terminating contact of said carrier particles with said droplets and continuing suspension of said carrier particles until said coating material coated on said carrier particles is substantially dry.

3. A method of coating electrostatographic carrier particles according to claim 1 wherein said carrier particles have an average particle size less than about 250 microns.

4. A method of coating electrostatographic carrier particles according to claim 1 including maintaining said upwardly flowing low pressure gas as an upwardly flowing ring of low pressure gas surrounding an upwardly flowing ring of high pressure gas.

5. A method of coating electrostatographic carrier particles according to claim 4 including supplying sufficient heat to said ring of low pressure gas to evaporate said carrier liquid.

6. A method of coating electrostatographic carrier praticles according to claim 4 including introducing said coating material within said upwardly flowing ring of high pressure gas into said fluidized bed.

7. A method of coating electrostatographic carrier particles according to claim 1 wherein said carrier liquid is selected from material which evaporates rapidly only upon heating to a temperature above ambient air temperature.

8. A method of coating electrostatographic carrier particles according to claim 1 wherein said carrier particles comprise steel shot and said coating material comprises about 0.95 percent by weight of carbon black, about 9.55 percent by weight of a terpolymer of methyl methacrylate, styrene, and vinyl triethoxysilane, about 20.7 percent by weight of toluene, and about 68.8 percent by weight of xylene based on the weight of said coating material.

* * * * *